United States Patent
Feder et al.

[15] 3,669,847
[45] June 13, 1972

[54] PROCESS FOR SEPARATING STEAM-VOLATILE ORGANIC SOLVENTS FROM INDUSTRIAL PROCESS WASTE WATERS

[72] Inventors: Ernst Feder, Niederkassel; Kurt Deselaers, Ranzel; Gunther Czehovsky, Niederkassel, all of Germany

[73] Assignee: Dynamit Nobel Aktiengesellschaft, Troisdorf, Germany

[22] Filed: July 24, 1969

[21] Appl. No.: 844,250

[30] Foreign Application Priority Data

July 26, 1968 Germany.....................P 17 92 147.0

[52] U.S. Cl..................................203/14, 203/67, 203/90, 203/95, 203/97, 203/88, 260/652 P, 260/654 S
[51] Int. Cl...........................................................B01d 3/06
[58] Field of Search.....................203/95, 96, 97, 67, 90, 88, 203/76, 79, 12, 14, 83, 85, 92, DIG. 14, 93; 202/176, 177; 159/48 L, 16 S; 260/652 P, 654 S

[56] References Cited

UNITED STATES PATENTS

| | | | |
|---|---|---|---|
| 2,297,004 | 9/1942 | Lee | 203/96 |
| 2,806,523 | 9/1957 | Nicolaisen | 159/48 L |
| 2,959,561 | 11/1960 | Kelley | 159/48 L |
| 3,089,250 | 5/1963 | Victor | 203/95 X |
| 3,341,429 | 9/1967 | Fondrk | 203/95 |
| 3,361,649 | 1/1968 | Karter | 203/12 |
| 3,409,515 | 11/1968 | Baird et al. | 159/16 |

*Primary Examiner*—Norman Yudkoff
*Assistant Examiner*—D. Edwards
*Attorney*—Craig, Antonelli and Hill

[57] ABSTRACT

Steam-volatile organic solvents are removed from process waste waters by intimately mixing the process waste waters with steam to form an azeotropic steam mixture, withdrawing the azeotropic steam mixture from the resultant mixture of steam and water, and condensing said azeotropic steam mixture. The major amount of process waste water, thus freed of solvent content, is discharged as general sewage. An apparatus designed to conduct said process is also described.

6 Claims, 1 Drawing Figure

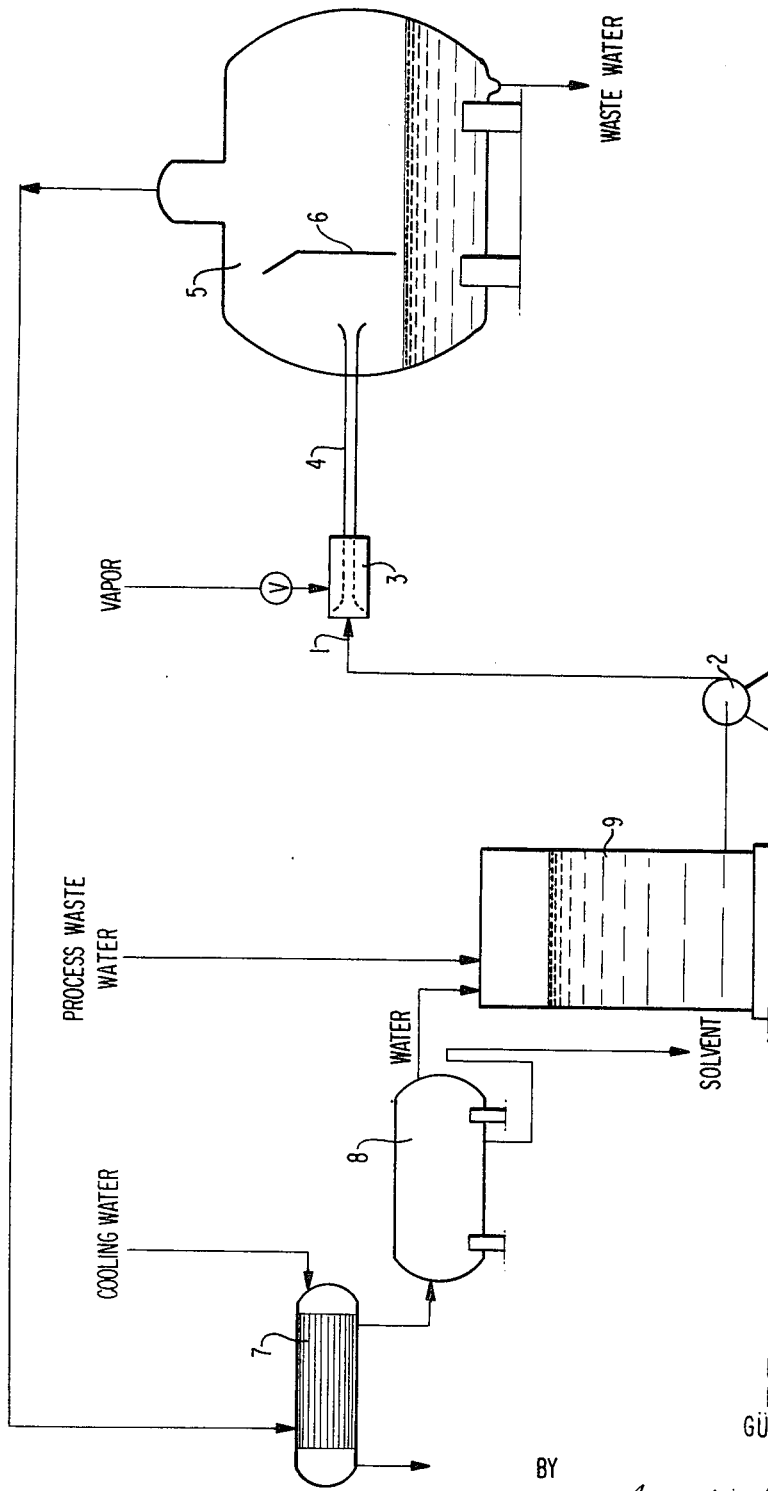

PROCESS FOR SEPARATING STEAM-VOLATILE ORGANIC SOLVENTS FROM INDUSTRIAL PROCESS WASTE WATERS

BACKGROUND OF THE INVENTION

This invention relates to a process and apparatus for the removal of solvents from process waste waters. More particularly, it relates to a process and apparatus for the removal of steam-volatile organic solvents dissolved in process waste waters.

Process waste waters (sewage) evolve to a greater or lesser degree during the production and process utilization of chlorinated hydrocarbons. In general, process waste water of this type is water which has become saturated during the direct contact thereof with the solvents employed to the extent of their existing solubilities. Heretofore, it was generally deemed sufficient to mechanically separate the solvent phase from such waste waters and then to discard the water. However, new laws relating to water conservation and water pollution only permit solvent concentrations in the waste water which range far below the solubility limit.

Accordingly, a number of processes has been developed in the prior art for removing the soluble proportion of such solvents from the water. In most cases, this is done by means of a procedure wherein azeotropic mixtures are driven off in variously constructed distillation columns. Since process waste waters of this type are often acidic and also polluted with sludge or solid phase materials, clogging and corrosion problems occur in the distillation columns employed for the process. This invention is based upon the problem of providing an apparatus that permits the separation of the solvent from the process waste water in a relatively simple manner.

Accordingly, one of the objects of the present invention is to provide an improved process and apparatus for the removal of organic solvents dissolved in process waste waters.

Another object of the present invention is to provide a process and apparatus for removing solvents from process waste waters which overcomes the disadvantages and deficiencies of the prior art.

A further object of the invention is to provide a process and apparatus for effecting these objectives in a relatively simple manner while preventing the clogging and corrosion problems encountered in the prior art.

These and other objects and advantages of the present invention will become apparent to those skilled in the art from a consideration of the following specification and claims and of the attached drawing.

SUMMARY OF THE INVENTION

In accordance with the present invention, the above-mentioned problems are solved and the enumerated objectives are met by a process which comprises intimately mixing the process waste water with steam, withdrawing the azeotropic steam mixture from the thus-produced steam-water mixture, and thereafter condensing this steam mixture. In this manner, the main amount of process waste water, having essentially no solvent content, is discharged into the general sewer. The temperature of the process waste water is increased to above the azeotropic point by supplying industrial steam thereto.

The apparatus used for conducting this process comprises a set-up, according to the invention, wherein a pump conveys the process waste water from a collecting tank to an injector, where it is mixed with industrial steam of 4–8 atmospheres gauge, and then the water flows into a settling and separating tank, wherein the azeotropic steam mixture separates from the remaining water and enters a condenser.

An advantageous embodiment of the invention resides in the provision that the solvent is separated from the remaining mixture from a two-phase separator disposed after the condenser. The residual water is then fed to the collecting tank.

The present invention satisfies the official requirements regarding the purity of process waste waters and also has the advantage that sludge-containing waste waters can be processed thereby, permitting the recovery of a high percentage of the solvents contained in the waste water.

The invention is described in greater detail hereinbelow by means of an example, with reference to the attached schematic drawing.

In the drawing, the process waste water, fed by a pump 2, is supplied, in a horizontally positioned pipe 1, with a sufficient quantity of steam by way of an injector 3, made of a corrosion-proof material, that a mixing temperature of 90°–100° C. is obtained as the ambient condition at the end of the mixing zone disposed behind the injector and fashioned as a pipe 4. This mixing zone has a length of about 2 meters and has a turbulent flow therein. The mixing pipe 4 terminates in a voluminous settling and separating tank 5 having a baffle 6, from which the liquid, aqueous or sludge laden phase can be discharged at the bottom, whereas the azeotropic steam mixture is withdrawn at the head (top) and is condensed in a condenser 7. A relatively small amount of solvent-saturated water and anhydrous (water-free) solvent mixture is obtained in a two-phase separator 8 connected downstream of said condenser. The residual proportion of the water is combined with the process waste water in a collecting tank 9.

EXAMPLES OF THE INVENTION

Example 1

Waste water having a chlorinated hydrocarbon content is fed in an amount of 5–6 cubic meters per hour by means of pump 2 into the apparatus of the invention. The waste water is mixed in the injector 3 with the required amount of factory steam of 4–8 atmospheres gauge so that a temperature of 90°–100 C. is present at the end of mixing pipe 4.

The following results are obtained. Gas chromatographic analysis indicates a content of 4,011 p.p.m. of dichloroethane and 381 p.p.m. of perchloroethylene in the supplied waste water. The water leaving the settling tank exhibits a solvent content of 62 p.p.m. of dichloroethane and 14 p.p.m. of perchloroethylene.

Example 2

Waste water containing solvent and sludge is fed at the rate of 7 cubic meters per hour into collecting tank 9. An amount of steam is admixed therewith such that a temperature of 96° C. is obtained at the end of mixing pipe 4.

The results obtained means of gas chromatography analysis are as follows. The analysis shows, in the supplied waste water, solvent contents of 2,733 p.p.m. of 1, 2-dichloroethane and 313 p.p.m. of perchloroethylene. The water discharged from the settling tank has a solvent content of 66 p.p.m. of 1,2-dichloroethane and 70 p.p.m. of perchloroethylene.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. A process for removing at least one steam-volatile organic solvent from process waste waters, said solvent being dichloroethane, perchloroethylene or mixtures thereof, which comprises intimately mixing the process waste water with steam so as to form an azeotropic steam-solvent mixture, withdrawing the azeotropic steam-solvent mixture from the resultant mixture of steam and water, and condensing said azeotropic steam-solvent mixture, the process waste water substantially free of solvent content remaining after withdrawal of said azeotropic mixture being discharged as general sewage.

2. The process of claim 1, wherein the temperature of the process waste water is increased to above the azeotropic point by supplying industrial steam thereto.

3. The process of claim 1, wherein said process waste water contains at least one chlorinated hydrocarbon as the solvent to be removed.

4. The process of claim 2, wherein the temperature of the process waste water is increased to about 90° to 100° C. with said steam.

5. The process of claim 1, wherein the condensed steam mixture is separated into a substantially water-free solvent portion and a solvent-saturated water portion, said solvent-saturated water portion being recycled to said process waste water for further treatment to remove the solvent therefrom.

6. The process of claim 2, wherein steam having a pressure of about 4 to 8 atmospheres gauge is mixed with said process waste water.

* * * * *